(12) United States Patent
Zhan et al.

(10) Patent No.: US 10,541,963 B2
(45) Date of Patent: Jan. 21, 2020

(54) COMMON MESSAGE SENDING METHOD, ELECTRONIC DEVICE, AND STORAGE MEDIUM

(71) Applicant: TENCENT TECHNOLOGY (SHENZHEN) COMPANY LIMITED, Shenzhen (CN)

(72) Inventors: Xuwei Zhan, Shenzhen (CN); Ming Tian, Shenzhen (CN); Zhongwei Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 339 days.

(21) Appl. No.: 14/682,357

(22) Filed: Apr. 9, 2015

(65) Prior Publication Data
US 2015/0215264 A1    Jul. 30, 2015

Related U.S. Application Data (63) Continuation of application No. PCT/CN2013/083466, filed on Sep. 13, 2013.

(30) Foreign Application Priority Data

Oct. 11, 2012 (CN) .......................... 2012-10384149

(51) Int. Cl.
*H04L 12/58* (2006.01)
*H04W 4/21* (2018.01)
(Continued)

(52) U.S. Cl.
CPC ........... *H04L 51/32* (2013.01); *G06Q 10/107* (2013.01); *G06Q 50/01* (2013.01);
(Continued)

(58) Field of Classification Search
CPC ....... G06Q 10/107; G06Q 50/01; H04W 4/21; H04L 12/1886; H04L 29/02;
(Continued)

(56) References Cited

U.S. PATENT DOCUMENTS 6,430,592 B1 * 8/2002 Davison ................ G06F 9/5061
718/103
7,774,409 B2 * 8/2010 Fitzpatrick ........... G06Q 10/107
709/206
(Continued)

FOREIGN PATENT DOCUMENTS

| CN | 102035891 A | 4/2011 |
|---|---|---|
| CN | 102360376 A | 2/2012 |

(Continued)

OTHER PUBLICATIONS

The World Intellectual Property Organization (WIPO) International Search Report for PCT/CN2013/083466 dated Dec. 19, 2013.
(Continued)

*Primary Examiner* — Thu V Nguyen
*Assistant Examiner* — Angela M Widhalm De Rodrig
(74) *Attorney, Agent, or Firm* — Anova Law Group, PLLC (57) ABSTRACT

The present disclosure relates to a common message sending method, an electronic device, and a non-transitory storage medium. According to user numbers on a platform, followers of a first user are acquired to construct a first subset, followers of a second user are acquired to construct a second subset. Common followers in the first subset and the second subset are acquired. A common message is sent to the common followers. The present disclosure further relates to an electronic device and a non-transitory storage medium. The common message sending method, the electronic device, and the storage medium according to the present
(Continued)

disclosure achieve efficient, fast sending of a common message by massive, comparison of followers to send a common message.

19 Claims, 5 Drawing Sheets

(51) Int. Cl.
| | | |
|---|---|---|
| H04L 12/18 | (2006.01) | |
| H04L 29/02 | (2006.01) | |
| H04L 29/08 | (2006.01) | |
| G06Q 50/00 | (2012.01) | |
| H04L 12/24 | (2006.01) | |
| G06Q 10/10 | (2012.01) | |
| H04L 29/06 | (2006.01) | |

(52) U.S. Cl.
CPC .......... *H04L 12/1886* (2013.01); *H04L 29/02* (2013.01); *H04L 41/5061* (2013.01); *H04L 51/16* (2013.01); *H04L 65/403* (2013.01); *H04L 67/22* (2013.01); *H04W 4/21* (2018.02)

(58) Field of Classification Search
CPC ..... H04L 41/5061; H04L 51/16; H04L 51/32; H04L 65/403; H04L 67/22
See application file for complete search history.

(56) References Cited

U.S. PATENT DOCUMENTS

| | | | | |
|---|---|---|---|---|
| 7,895,273 | B1* | 2/2011 | Haldar | G06Q 10/10 370/229 |
| 8,130,917 | B2* | 3/2012 | Helbling | H04L 12/18 379/88.13 |
| 8,364,716 | B2* | 1/2013 | Gaonkar | G06F 17/30156 707/791 |
| 8,392,248 | B2* | 3/2013 | Cosman | G06Q 10/087 705/14.4 |
| 9,552,334 | B1* | 1/2017 | Meisels | G06F 17/218 |
| 2003/0097370 | A1* | 5/2003 | Yamamoto | G06F 16/2471 |
| 2004/0260701 | A1* | 12/2004 | Lehikoinen | G06F 17/3089 |
| 2005/0171954 | A1* | 8/2005 | Hull | H04L 51/32 |
| 2005/0198158 | A1* | 9/2005 | Fabre | G06Q 10/107 709/206 |
| 2009/0307349 | A1* | 12/2009 | Harris | H04L 67/24 709/224 |
| 2010/0161369 | A1* | 6/2010 | Farrell | G06Q 50/01 705/319 |
| 2010/0174679 | A1* | 7/2010 | Baynes, Jr. | H04L 29/06 707/617 |
| 2011/0010641 | A1* | 1/2011 | Wolff | G06Q 10/107 715/753 |
| 2011/0302249 | A1* | 12/2011 | Orr | G06Q 10/107 709/206 |
| 2012/0221571 | A1* | 8/2012 | Orman | G06F 17/3097 707/737 |
| 2013/0117383 | A1* | 5/2013 | Hymel | G06Q 10/107 709/206 |
| 2013/0139182 | A1* | 5/2013 | Sethuraman | G06Q 50/01 719/320 |
| 2013/0156169 | A1* | 6/2013 | Alberth | H04M 3/465 379/88.16 |
| 2013/0268603 | A1* | 10/2013 | Aldosari | G06Q 50/01 709/206 |
| 2014/0162698 | A1* | 6/2014 | Han | H04W 4/00 455/456.3 |
| 2015/0033145 | A1* | 1/2015 | Forstall | G06Q 10/107 715/752 |
| 2016/0139948 | A1* | 5/2016 | Beveridge | G06F 9/45558 718/1 |

FOREIGN PATENT DOCUMENTS

| | | |
|---|---|---|
| CN | 102724139 A | 10/2012 |
| CN | 102724140 A | 10/2012 |
| CN | 102724168 A | 10/2012 |

OTHER PUBLICATIONS

State Intellectual Property Office of the P.R.C (SIPO) Office Action 1 for 201210384149.5 Mar. 15, 2017 9 Pages.

* cited by examiner

FIG. 1

(Prior Art)

First subset     Common follower     Second subset

COMMON MESSAGE SENDING METHOD, ELECTRONIC DEVICE, AND STORAGE MEDIUM

CROSS-REFERENCES TO RELATED APPLICATIONS

This application is a continuation of PCT Application No. PCT/CN2013/083466, filed on Sep. 13, 2013, which claims priority to Chinese Patent Application No. CN 201210384149.5, filed on Oct. 11, 2012, the entire contents of all of which are incorporated herein by reference.

FIELD OF THE TECHNOLOGY

The present disclosure relates to the field of computer technologies, and in particular, relates to an efficient, fast common message sending method, electronic device, and storage medium.

BACKGROUND OF THE DISCLOSURE

User Generated Content (UGC) is a new manner for a user to use the Internet. That is, the focus turns from original download only into both download and upload. Social networks, video sharing, blogs, and the like are all main application forms of UGC. With the increasing diversity of intelligent terminals and the ongoing development of global Internet services, UGC services are growing on a daily basis, and have attracted wide attention in the industry.

Figure 1:
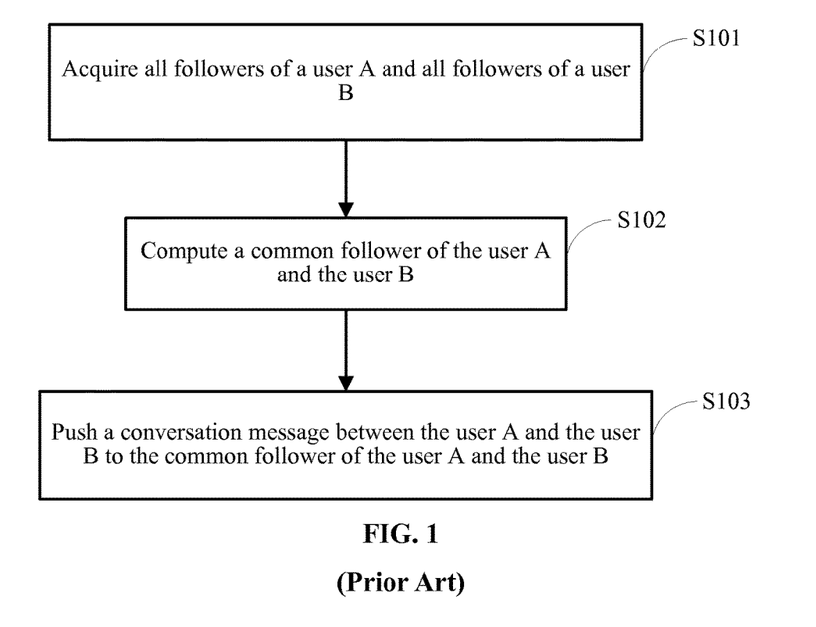
FIG. 1 is a schematic flowchart of an existing UGC-based service method for sending a common message.

FIG. 1 is a schematic flowchart of an existing UGC-based service method for sending a common message. An objective of the service is to push, by messages, a conversation between a user A and a user B (for example, a conversation between celebrities) to a common follower of the user A and the user B. The service is, for example, an existing "conversation" application service in Tencent Weibo. The service method includes: Step S101, acquiring all followers of the user A and all followers of the user B; Step S102: computing a common follower of the user A and the user B; Step S103: pushing a conversation message between the user A and the user B to the common follower of the user A and the user B.

In the use of the foregoing service method for sending a common message, because all the followers of the user A and all the followers of the user B need to be acquired, when the user A and the user B have a large quantity of followers, the acquisition takes a relatively long time, which may cause a severe delay problem.

Meanwhile, because in the service, only a conversation message is pushed to a common follower of the user A and the user B, if the user A and the user B have followers that are very different in quantity (for example, the user A only has one follower, whereas the user B has a thousand followers), finally a user to which a message is sent mainly depends on a user having a smaller quantity of followers. Therefore, a lot of unnecessary acquisition of followers occurs in a process of acquiring all the followers of the user A and the user B, resulting in relatively low efficiency in performing the service.

Therefore, there is a need to solve technical problems in the Internet and computer technology to provide efficient, fast sending of a common message.

BRIEF SUMMARY OF THE DISCLOSURE

An objective of the present disclosure is to provide a common message sending method, an electronic device, and a storage medium that achieve efficient, fast sending of a common message by comparison between followers (or friends) and by sending of a common message in batches, thereby solving technical problems of a long-time delay and low efficiency in sending the common message in an existing common message sending method and apparatus.

One aspect or embodiment of the present disclosure includes a common message sending method. In Step A, according to user numbers on a platform, followers of a first user are acquired to construct a first subset, and followers of a second user are acquired to construct a second subset. The quantity of followers in the first subset and the quantity of followers in the second subset are preset values. In Step B, common followers in the first subset and the second subset are acquired. A common message is sent to the common followers, followed by returning to Step A until acquisition of the followers of the first user is completed or acquisition of the followers of the second user is completed.

Another aspect or embodiment of the present disclosure includes an electronic device. The electronic device includes one or more processors; a memory; and one or more programs, stored in the memory, and configured to be executed by the one or more processors to provide a common message sending method. The one or more programs are divided according to functions and include a follower acquisition module, and a common message sending module. The follower acquisition module is configured to acquire, according to user numbers on a platform, followers of a first user to construct a first subset, and acquire followers of a second user to construct a second subset. The quantity of followers in the first subset and the quantity of followers in the second subset are both preset values. The common message sending module is configured to acquire common followers in the first subset and the second subset, and send a common message to the common followers.

Another aspect or embodiment of the present disclosure includes a storage medium, storing an instruction executable by a processor, and the processor executing the instruction to provide a common message sending method. In Step A: according to user numbers on a platform, followers of a first user are acquired to construct a first subset, and followers of a second user are acquired to construct a second subset. The quantity of followers in the first subset and the quantity of followers in the second subset are both preset values. In Step B: common followers in the first subset and the second subset are acquired. A common message is sent to the common followers, followed by returning to Step A until acquisition of the followers of the first user is completed or acquisition of the followers of the second user is completed.

Compared with existing methods and apparatus, the common message sending method, electronic device, and storage medium according to the present disclosure achieve efficient, fast sending of a common message by comparison of followers and sending of a common message in batches, thereby solving technical problems of a long-time delay and low efficiency in sending a common message in an existing common message sending method and apparatus.

Other aspects or embodiments of the present disclosure can be understood by those skilled in the art in light of the description, the claims, and the drawings of the present disclosure.

BRIEF DESCRIPTION OF THE DRAWINGS

To describe the technical solutions of the embodiments of the present invention or the prior art more clearly, the following briefly introduces the accompanying drawings required for describing the embodiments or the prior art. Apparently, the accompanying drawings in the following description show only some embodiments of the present invention, and a person of ordinary skill in the art may still derive other drawings from these accompanying drawings without creative efforts. In these accompanying drawings.

DETAILED DESCRIPTION OF EMBODIMENTS

Reference will now be made in detail to exemplary embodiments of the disclosure, which are illustrated in the accompanying drawings. Wherever possible, the same reference numbers will be used throughout the drawings to refer to the same or like parts. The principle of the present disclosure is illustrated through implementation in a suitable operating environment. The following description is based on illustrated specific embodiments of the present invention, and should not be construed as a limitation on other specific embodiments that are not described in detail in the present disclosure.

In the description that follows, the present disclosure will be described with reference to steps and symbolic representations of operations that are performed by one or more computers, unless indicated otherwise. As such, it will be understood that such steps and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the present disclosure is being described in the foregoing context, it is not meant to be limiting as those of skill in the art will appreciate that various steps and operations described hereinafter may also be implemented in hardware.

For the principle of the present disclosure, many other universal or objective-specific operations, communication environments or configurations can be used. Examples of well-known operating systems, environments, and configurations suitable for use with the present disclosure include (but are not limited to) a mobile phone, a personal computer, a server, a multiprocessor system, a microcomputer-based system, a mainframe computer, and a distributed operating environment that includes any of the above systems or apparatuses.

Figure 2:
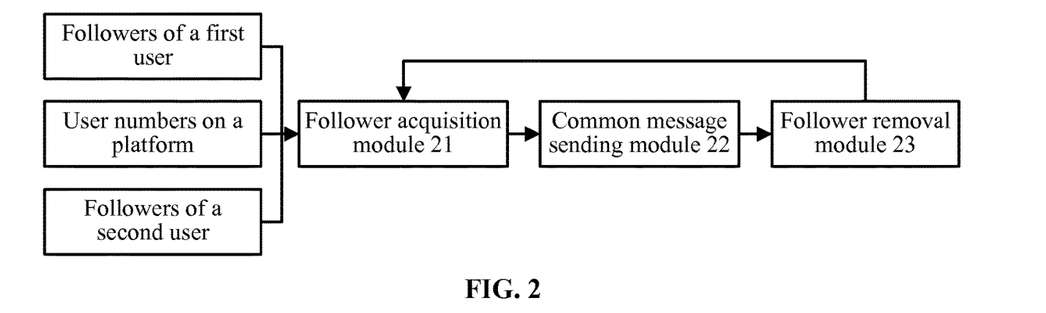
FIG. 2 is a schematic structural diagram of an exemplary embodiment of an electronic device according to various embodiments of the present disclosure.

The present disclosure provides an electronic device, as shown in FIG. 2. FIG. 2 is a schematic structural diagram of a preferred embodiment of the electronic device according to the present disclosure. The electronic device includes one or more processors, a memory (e.g., a non-transitory computer readable storage medium), and one or more programs stored in the memory and configured to be executed by the one or more processors to provide a common message sending method. The one or more programs are divided according to functions, and include a follower acquisition module 21, a common message sending module 22, and a follower removal module 23.

The follower acquisition module 21 is configured to acquire, according to user numbers on a platform, followers of a first user to construct a first subset, and acquire followers of a second user to construct a second subset. The quantity of followers in the first subset and the quantity of followers in the second subset are both preset values.

The common message sending module 22 is configured to acquire common followers in the first subset and the second subset, and send a common message to the common followers. The follower removal module 23 is configured to determine, according to user numbers of the followers in the first subset and user numbers of the followers in the second subset, to remove the followers in the first subset or the followers in the second subset.

In the use of the electronic device according to the present disclosure, the follower acquisition module 21 first acquires, according to the user numbers on the platform, the followers of the first user to construct the first subset, and acquires the followers of the second user to construct the second subset.

Specifically, the follower acquisition module 21 acquires, according to the user numbers on the platform, followers, whose quantity is the preset value, of the first user in an ascending or a descending order, and acquires followers, whose quantity is the preset value, of the second user in an ascending or a descending order. The follower acquisition module 21 then sets the followers, whose quantity is the preset value, of the first user as the first subset, and sets the followers, whose quantity is the preset value, of the second user as the second subset. The preset value may be set according to a specific requirement. For example, the preset value can be 50, 500, or any suitable value for grouping followers in each of the first and/or second subsets to facilitate sending common messages in batches.

The common message sending module 22 then acquires common followers in the first subset and the second subset, and sends a common message to the common followers. The common message may include: conversation information (e.g., including text, audio, and/or video information) and the like, between the first user and the second user.

The follower removal module 23 then determines, according to the user numbers of the followers in the first subset and the user numbers of the followers in the second subset, to remove the followers in the first subset and/or the followers in the second subset.

As disclosed herein, "to remove the followers in the first subset and/or the followers in the second subset" may include: to remove all the followers in the first subset or all the followers in the second subset, or to remove the followers in the first subset and the followers in the second subset at the same time.

Specifically, in a case of acquiring the followers of the first user in an ascending order to form the first subset and acquiring the followers of the second user in an ascending order (or a descending order) to form the second subset, if the highest user number of the followers in the first subset is greater than the highest user number of the followers in the second subset, the follower removal module 23 removes all the followers in the second subset. Alternatively, if the highest user number of the followers in the first subset is less than the highest user number of the followers in the second subset, the follower removal module 23 removes all the followers in the first subset.

In a case of acquiring the followers of the first user in a descending order to form the first subset and acquiring the followers of the second user in a descending order (or an ascending order) to form the second subset: if the lowest user number of the followers in the first subset is less than the lowest user number of the followers in the second subset, the follower removal module 23 removes all the followers in the second subset. Alternatively, if the lowest user number of the followers in the first subset is greater than the lowest user number of the followers in the second subset, the follower removal module 23 removes all the followers in the first subset.

In a case of acquiring the followers of the first user in an ascending order to form the first subset and acquiring the followers of the second user in an ascending order (or a descending order) to form the second subset: if the highest user number of the followers in the first subset is greater than the highest user number of the followers in the second subset, the follower removal module 23 may remove all the followers in the second subset, and may also remove followers, whose user numbers are less than or equal to the highest user number in the second subset, in the first subset. Alternatively, if the highest user number of the followers in the first subset is less than the highest user number of the followers in the second subset, the follower removal module 23 may remove all the followers in the first subset, and may also remove followers, whose user numbers are less than or equal to the highest user number in the first subset, in the second subset.

In a case of acquiring the followers of the first user in a descending order to form the first subset and acquiring the followers of the second user in a descending order (or an ascending order) to form the second subset: if the lowest user number of the followers in the first subset is less than the lowest user number of the followers in the second subset, the follower removal module 23 may remove all the followers in the second subset, and may also remove followers, whose user numbers are greater than or equal to the lowest user number in the second subset, in the first subset. Alternatively, if the lowest user number of the followers in the first subset is greater than the lowest user number of the followers in the second subset, the follower removal module 23 may remove all the followers in the first subset, and may also remove followers, whose user numbers are greater than or equal to the lowest user number in the first subset, in the second subset.

Subsequently, the follower acquisition module 21 continues to acquire, according to the user numbers on the platform, followers whose quantity is the preset value, for the subset from which followers are removed, so that the first subset and the second subset both have followers whose quantities are the preset values. Or acquisition of the followers of the first user is completed or acquisition of the followers of the second user is completed.

For example, if the follower removal module 23 finds that acquisition of the followers of the first user is completed, and the followers in the first subset have been removed, or if the follower removal module 23 finds that acquisition of the followers of the second user is completed, and the followers in the second subset have been removed, a process for sending a common message by the electronic device according to the present disclosure is completed.

In an exemplary embodiment, the common message sending module 22 of the electronic device according to the present disclosure includes an online common message sending unit and an offline common message sending unit. The online common message sending unit is configured to send a common message for an online follower, and the offline common message sending unit is configured to send a common message for an offline follower. A processing priority level of the online common message sending unit is higher than that of the offline common message sending unit. According to different requirements for a real-time message of an online user and an offline user, processing of common message sending at different priority levels is performed for the online user and the offline user, thereby further reducing pressure on a message sending server, and achieving fast sending of a common message for an online user.

As such, the disclosed electronic device can be configured to perform a method of sending a common message, which can be same as or similar to an exemplary common message sending method described in the following.

Figure 3:
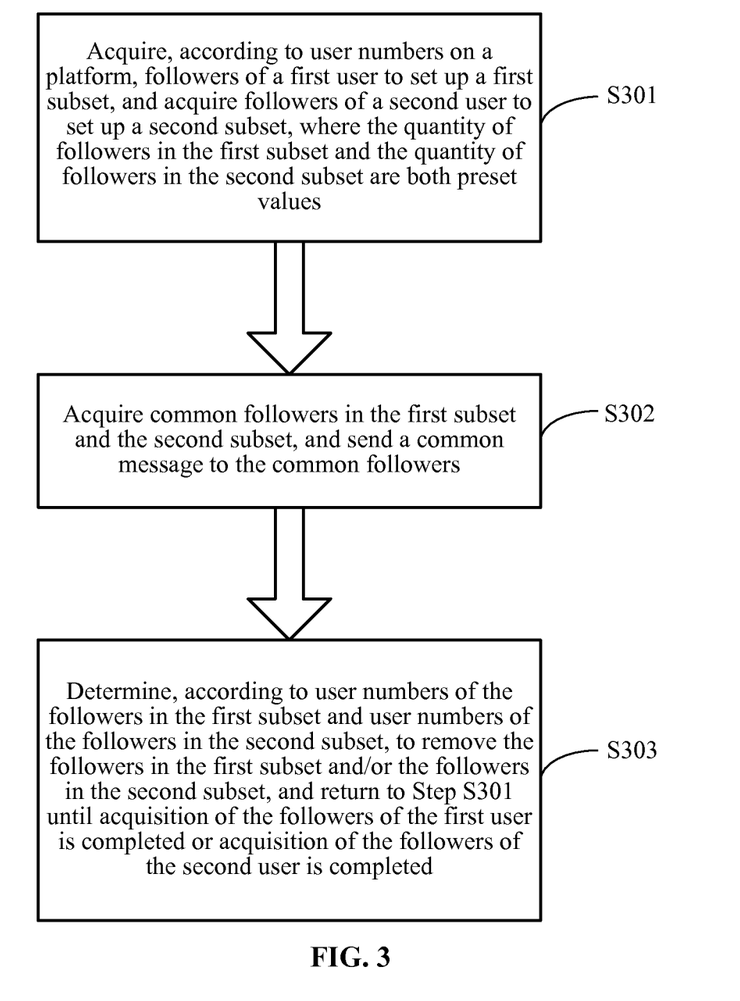
FIG. 3 is a flowchart of an exemplary embodiment of a common message sending method according to various embodiments of the present disclosure.

FIG. 3 is a flowchart of a preferred embodiment of a common message sending method according to the present disclosure. The common message sending method includes: Step S301 to acquire, according to user numbers on a platform, followers of a first user to construct a first subset, and acquire followers of a second user to construct a second subset, where the quantity of followers in the first subset and the quantity of followers in the second subset are both preset values; Step S302 to acquire common followers in the first subset and the second subset, and send a common message to the common followers; and Step S303 to determine, according to user numbers of the followers in the first subset and user numbers of the followers in the second subset, to remove the followers in the first subset and/or the followers in the second subset, and to return to Step S301 until acquisition of the followers of the first user is completed or acquisition of the followers of the second user is completed.

In this way, the common message of the first user and the second user is rapidly and efficiently sent to the common followers of the first user and the second user.

In a specific embodiment, a common message sending method according to the present disclosure is described in detail below.

In Step S301, the follower acquisition module 21 acquires, according to the user numbers on the platform, followers of the first user to construct the first subset, and acquire followers of the second user to construct the second subset. The user numbers on the platform here refer to unique identifiers of all registered users on the platform. By using this user number, the followers of the first user and the followers of the second user may be categorized into a first subset and a second subset according to a certain rule, thereby preventing a same follower from being repeatedly put into a same subset.

Specifically, the follower acquisition module 21 acquires, according to the user numbers on the platform, followers, whose quantity is the preset value, of the first user in an ascending or a descending order, and acquires followers, whose quantity is the preset value, of the second user in an ascending or a descending order.

The follower acquisition module 21 then sets the followers, whose quantity is the preset value, of the first user as the first subset, and sets the followers, whose quantity is the preset value, of the second user as the second subset. The preset value may be set according to a specific requirement (for example, the preset value can be about 50 or about 500). A manner of acquiring followers according to the user numbers on the platform is not only limited to an ascending order of the user numbers or a descending order of the user numbers (although such a manner is relatively simple to implement). Any other suitable manners may be used for acquisition (for example, grouping acquisition, or random acquisition) as long as it is ensured that a manner of acquiring a follower does not repeatedly categorize a follower with a certain user number into a same subset.

Subsequently, the process turns to Step S302. In Step S302, the common message sending module 22 acquires common followers in the first subset and the second subset, and sends the common message to the common followers. The common message may be conversation information (e.g., including text, audio, and/or video information), and the like between the first user and the second user.

Subsequently, the process turns to Step S303. In Step S303, the follower removal module 23 determines, according to the user numbers of the followers in the first subset and the user numbers of the followers in the second subset, to remove the followers in the first subset and/or the followers in the second subset.

As disclosed herein, "to remove the followers in the first subset and/or the followers in the second subset" may include to remove all the followers in the first subset or all the followers in the second subset, or to remove the followers in the first subset and the followers in the second subset at the same time. Certainly, the removal here may be physical deletion, or may also be conceptual deletion (not actual deletion).

Specifically, in a case of acquiring the followers of the first user in an ascending order to form the first subset and acquiring the followers of the second user in an ascending order (or a descending order) to form the second subset: if the highest user number of the followers in the first subset is greater than the highest user number of the followers in the second subset, the follower removal module 23 removes all the followers in the second subset. Alternatively, if the highest user number of the followers in the first subset is less than the highest user number of the followers in the second subset, the follower removal module 23 removes all the followers in the first subset.

In a case of acquiring the followers of the first user in a descending order to form the first subset and acquiring the followers of the second user in a descending order (or an ascending order) to form the second subset: if the lowest user number of the followers in the first subset is less than the lowest user number of the followers in the second subset, the follower removal module 23 removes all the followers in the second subset. Alternatively, if the lowest user number of the followers in the first subset is greater than the lowest user number of the followers in the second subset, the follower removal module 23 removes all the followers in the first subset.

In a case of acquiring the followers of the first user in an ascending order to form the first subset and acquiring the followers of the second user in an ascending order (or a descending order) to form the second subset: if the highest user number of the followers in the first subset is greater than the highest user number of the followers in the second subset, the follower removal module 23 may remove all the followers in the second subset, and may also remove followers, whose user numbers are less than or equal to the highest user number in the second subset, in the first subset. Alternatively, if the highest user number of the followers in the first subset is less than the highest user number of the followers in the second subset, the follower removal module 23 may remove all the followers in the first subset, and may also remove followers, whose user numbers are less than or equal to the highest user number in the first subset, in the second subset.

In a case of acquiring the followers of the first user in a descending order to form the first subset and acquiring the followers of the second user in a descending order (or an ascending order) to form the second subset: if the lowest user number of the followers in the first subset is less than the lowest user number of the followers in the second subset, the follower removal module 23 may remove all the followers in the second subset, and may also remove followers, whose user numbers are greater than or equal to the lowest user number in the second subset, in the first subset. Alternatively, if the lowest user number of the followers in the first subset is greater than the lowest user number of the followers in the second subset, the follower removal module 23 may remove all the followers in the first subset, and may also remove followers, whose user numbers are greater than or equal to the lowest user number in the first subset, in the second subset.

In Step S302, after the common message sending module 22 sends the common message to a part of the common followers, the follower removal module 23 may remove followers on which determination of a common follower has been performed. However, determination of a common follower may be not performed on some followers in the first subset or the second subset. For example, the user numbers of the followers in the first subset may be from 0 to 577, the user numbers of the followers in the second subset may be from 0 to 677. For the followers in the second subset whose user numbers are from 578 to 677, because corresponding followers may be not chosen in the first subset, effective determination as a common follower may not be performed on the followers, whose user numbers are 578-677, in the second subset. Therefore, in this step, all followers in one subset whose highest user number is smaller are removed (while, partial removal may be optionally used for the other subset). For the other subset in which followers may have not gone through determination of a common follower, a next cycle of determination of a common follower continues to be performed.

Subsequently, the process returns to Step S301. The follower acquisition module 21 continues to acquire, according to the user numbers on the platform, followers, whose quantity is the preset value, for the subset from which followers are removed, so that after Step S301 is completed, the first subset and the second subset both have followers whose quantities are the preset values, or acquisition of the followers of the first user is completed or acquisition of the followers of the second user is completed (for example, acquisition of the followers of the first user is completed, which may result in that the quantity of the followers in the first subset cannot reach the preset value).

For example, when in Step S303, the follower removal module 23 finds that acquisition of the followers of the first user is completed (a message of completed acquisition is generated from an acquisition operation that fails to acquire, followers whose quantity is the preset value, of the first user in previous Step S301), and in Step S303, the followers in the first subset have been removed; or the follower removal module 23 finds that acquisition of the followers of the second user is completed, and in Step S303, the followers in the second subset have been removed, a process of sending a common message according to the present disclosure is completed.

Exemplarily, the common message sending method according to the present disclosure performs separate processing for sending of a common message for an online follower and sending of a common message for an offline follower. And at the same time a processing priority level of sending of a common message for the online follower is higher than that of sending of a common message for the offline follower. According to different requirements for a real-time message of an online user and an offline user, processing of common message sending at different priority levels is performed for the online user and the offline user, thereby further reducing pressure on a message sending server, and achieving fast sending of a common message for an online user.

Figure 4:
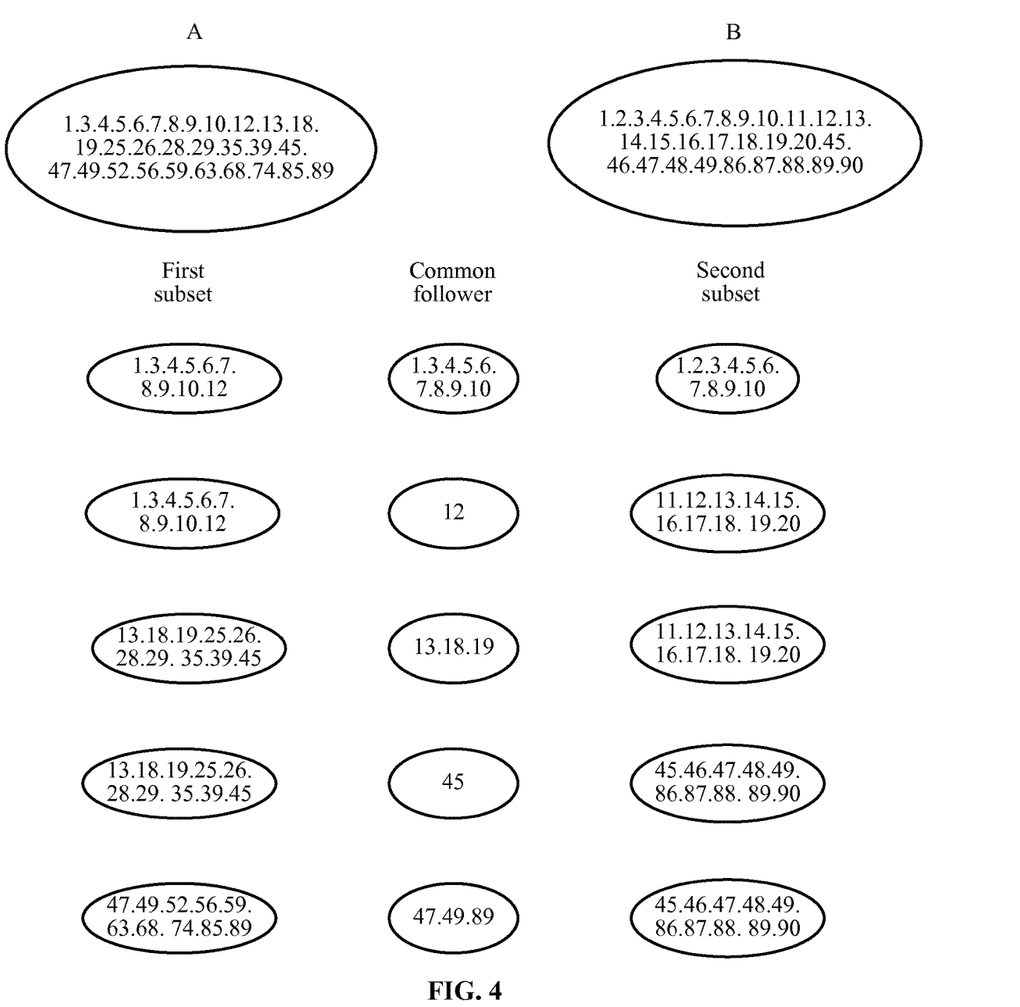
FIG. 4 is a flowchart of a first specific embodiment of a common message sending method and an electronic device according to various embodiments of the present disclosure.

Working procedures of the common message sending method and an electronic device according to the present disclosure are described below in detail with reference to the specific embodiments of FIG. 4 and FIG. 5. FIG. 4 is a flowchart of a first specific embodiment of a common message sending method and an electronic device according to the present disclosure. In this specific embodiment, friends (special followers) of a first user are acquired in an ascending order to form a first subset, friends of a second user are acquired in an ascending order (or a descending order) to form a second subset, and an exemplary manner of removing friends in the first subset and/or friends in the second subset is to remove all friends in the first subset or all friends in the second subset.

User numbers of friends of a user A are provided on the top left side of FIG. 4 including: 1.3.4.5.6.7.8.9.10.12.13.18.19.25.26.28.29.35.39.45.47.49. 52.56.59.63.68.74.85.89. User numbers of friends of a user B are provided on the top right side of FIG. 4 including: 1.2.3.4.5.6.7.8.9.10.11.12.13.14.15.16.17.18.19.20.45.46. 47.48.49.86.87.88.89.90.

In this specific embodiment, the preset values of quantities in the first subset and the second subset are both set to be 10. In this way, friends of the user A are acquired for the first time to form the first subset (1.3.4.5.6.7.8.9.10.12), and friends of the user B are acquired for the first time to form the second subset (1.2.3.4.5.6.7.8.9.10). Next, common friends (1.3.4.5.6.7.8.9.10) in the first subset and the second subset are acquired, and a common message is sent to the common friends. Because the highest user number 12 of the friends in the first subset is greater than the highest user number 10 of the friends in the second subset, all the friends in the second subset are removed.

Subsequently, friends of the user B are acquired for the second time to form the second subset (11.12.13.14.15.16.17.18.19.20). Next, a common friend (12) in the first subset and the second subset is acquired, and a common message is sent to the common friend. Because the highest user number 12 of the friends in the first subset is less than the highest user number 20 of the friends in the second subset, all the friends in the first subset are removed.

Subsequently, friends of the user A are acquired for the second time to form the first subset (13.18.19.25.26.28.29.35.39.45). Next, common friends (13.18.19) in the first subset and the second subset are acquired, and a common message is sent to these common friends. Because the highest user number 45 of the friends in the first subset is greater than the highest user number 20 of the friends in the second subset, all the friends in the second subset are removed.

Subsequently, friends of the user B are acquired for the third time to form the second subset (45.46.47.48.49.86.87.88.89.90). Next, a common friend (45) in the first subset and the second subset is acquired, and a common message is sent to the common friend. Because the highest number 45 of the friends in the first subset is less than the highest user number 90 of the friends in the second subset, all the friends in the first subset are removed.

Subsequently, friends of the user A are acquired for the third time to form the first subset (47.49.52.56.59.63.68.74.85.89). Next, common friends (47.49.89) in the first subset and the second subset are acquired, and a common message is sent to these common friends. Because the highest number 89 of the friends in the first subset is less than the highest user number 90 of the friends in the second subset, all the friends in the first subset are removed. In this case, acquisition of all the friends of the user A is completed, and the friends in the first subset have been removed; therefore, the first subset can no longer acquire a new friend, that is, a process of sending a common message of the present disclosure is completed, a common message of the user A and the user B is sent to all common friends of the user A and the user B in batches or in groups.

Figure 5:
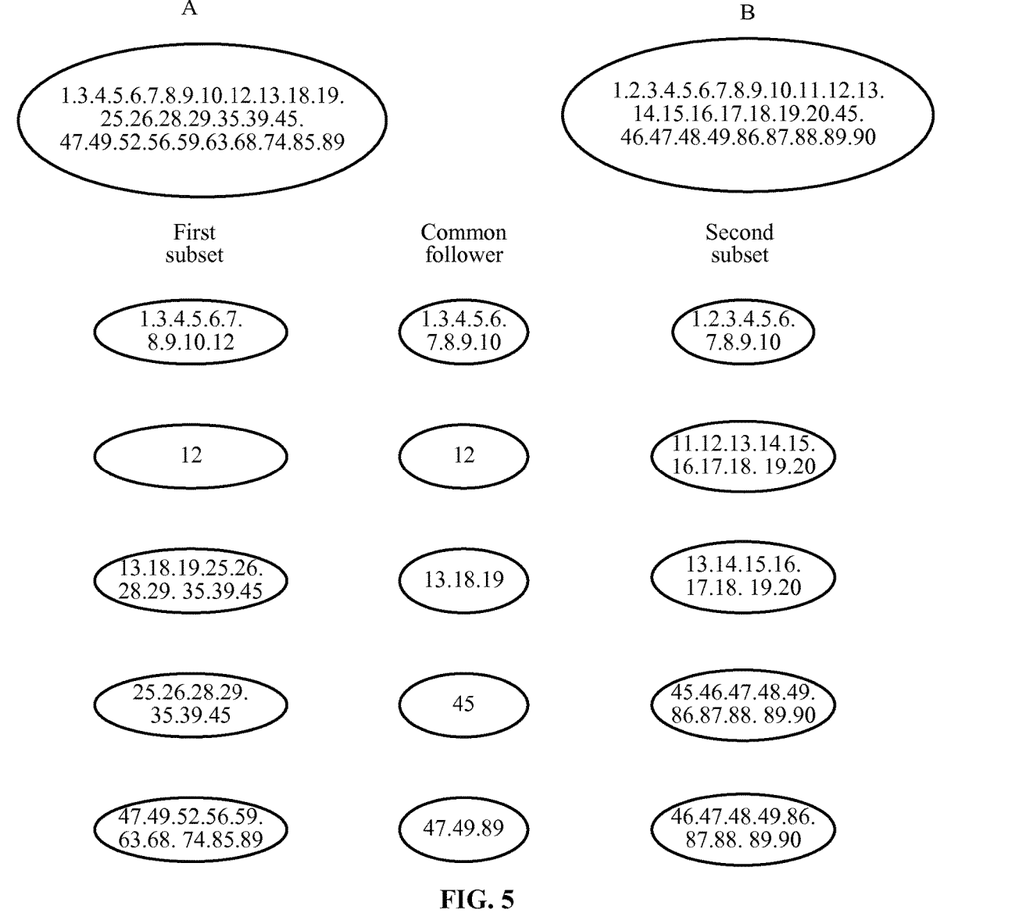
FIG. 5 is a flowchart of a second specific embodiment of a common message sending method and an electronic device according to various embodiments of the present disclosure.

FIG. 5 is a flowchart of a second specific embodiment of a common message sending method and an electronic device according to the present disclosure. In this specific embodiment, friends of the first user are acquired in an ascending order to form a first subset and friends of a second user are acquired in an ascending order (or a descending order) to form a second subset, and a manner of removing the friends in the first subset and/or the friends in the second subset is removing the friends in the first subset and friends in the second subset at the same time.

User numbers of friends of a user A are provided on the top left side of FIG. 5 including: 1.3.4.5.6.7.8.9.10.12.13.18.19.25.26.28.29.35.39.45.47.49. 52.56.59.63.68.74.85.89. User numbers of friends of a user B are provided on the top right side of FIG. 5 including: 1.2.3.4.5.6.7.8.9.10.11.12.13.14.15.16.17.18.19.20.45.46. 47.48.49.86.87.88.89.90.

In this preferred embodiment, the preset values of quantities in the first subset and the second subset are both set to be 10. In this way, friends of the user A are acquired for the first time to form the first subset (1.3.4.5.6.7.8.9.10.12), and friends of the user B are acquired for the first time to form the second subset (1.2.3.4.5.6.7.8.9.10). Next, common friends (1.3.4.5.6.7.8.9.10) in the first subset and the second subset are acquired, and a common message is sent to these common friends. Because the highest user number 12 of the friends in the first subset is greater than the highest user number 10 of the friends in the second subset, all the friends in the second subset and friends, whose user numbers are less than or equal to 10, in the first subset are removed.

Subsequently, friends of the user B are acquired for the second time to form the second subset (11.12.13.14.15.16.17.18.19.20). Next, a common friend (12) in the first subset and the second subset is acquired, and a common message is sent to the common friend. Because the highest user number 12 of the friends in the first subset is less than the highest user number 20 of the friends in the second subset, all the friends in the first subset and friends, whose user numbers are less than or equal to 12, in the second subset are removed.

Subsequently, friends of the user A are acquired for the second time to form the first subset (13.18.19.25.26.28.29.35.39.45). Next, common friends (13.18.19) in the first subset and the second subset are acquired, and a common message is sent to these common friends. Because the highest user number of the friends in the first subset 45 is greater than the highest user number 20 of the friends in the second subset, all the friends in the second subset and friends, whose user numbers are less than or equal to 20, in the first subset are removed.

Subsequently, friends of the user B are acquired for the third time to form the second subset (45.46.47.48.49.86.87.88.89.90). Next, a common friend (45) in the first subset and the second subset is acquired, and a common message is sent to the common friend. Because the highest number 45 of the friends in the first subset is less than the highest user number 90 of the friends in the second subset, all the friends in the first subset and friends, whose user numbers are less than or equal to 45, in the second subset are removed.

Subsequently, friends of the user A are acquired for the third time to form the first subset (47.49.52.56.59.63.68.74.85.89). Next, common friends (47.49.89) in the first subset and the second subset are acquired, and a common message is sent to these common friends. Because the highest number 89 of the friends in the first subset is less than the highest user number 90 of the friends in the second subset, all the friends in the first subset and friends, whose user numbers are less than or equal to 89, in the second subset are removed. However, at this time, acquisition of all the friends of the user A is completed, and the friends in the first subset have been removed; therefore, the first subset can no longer acquire a new friend, that is, a process of sending a common message is sent of the present disclosure is completed, and a common message of the user A and the user B is sent to all common friends of the user A and the user B in batches according to the pre-set value (e.g., the preset value is 10 in this example).

A person of ordinary skill in the art may understand that all or some of the steps in the methods of the foregoing embodiments may be implemented by a computer program instructing relevant hardware. The program may be stored in a non-transitory computer-readable storage medium. When the program is run, the procedures of the embodiments of the foregoing method are performed. The non-transitory computer-readable storage medium may be a magnetic disk, an optical disk, a Read-Only Memory (ROM), a Random Access Memory (RAM), and the like.

For the disclosed common message sending method, electronic device, and storage medium according to the present disclosure, by means of comparison of followers and sending of a common message in batches, unnecessary acquisition of followers is reduced, a cost of transmission bandwidth is reduced, efficiency of sending a common message is improved, and efficient, fast sending of a common message is achieved; meanwhile, different priority levels of message sending are used for an online user and an offline user, so that an effect of service experience for the online user is further improved, while little influence is exerted on an effect of service experience for the offline user; and technical problems of a relatively long-time delay and low efficiency in sending a common message in an existing common message sending method and apparatus are solved.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Certainly, those skilled in the art will recognize many modifications may be made to this configuration without departing from the scope or spirit of the claimed subject matter.

Figure 6:
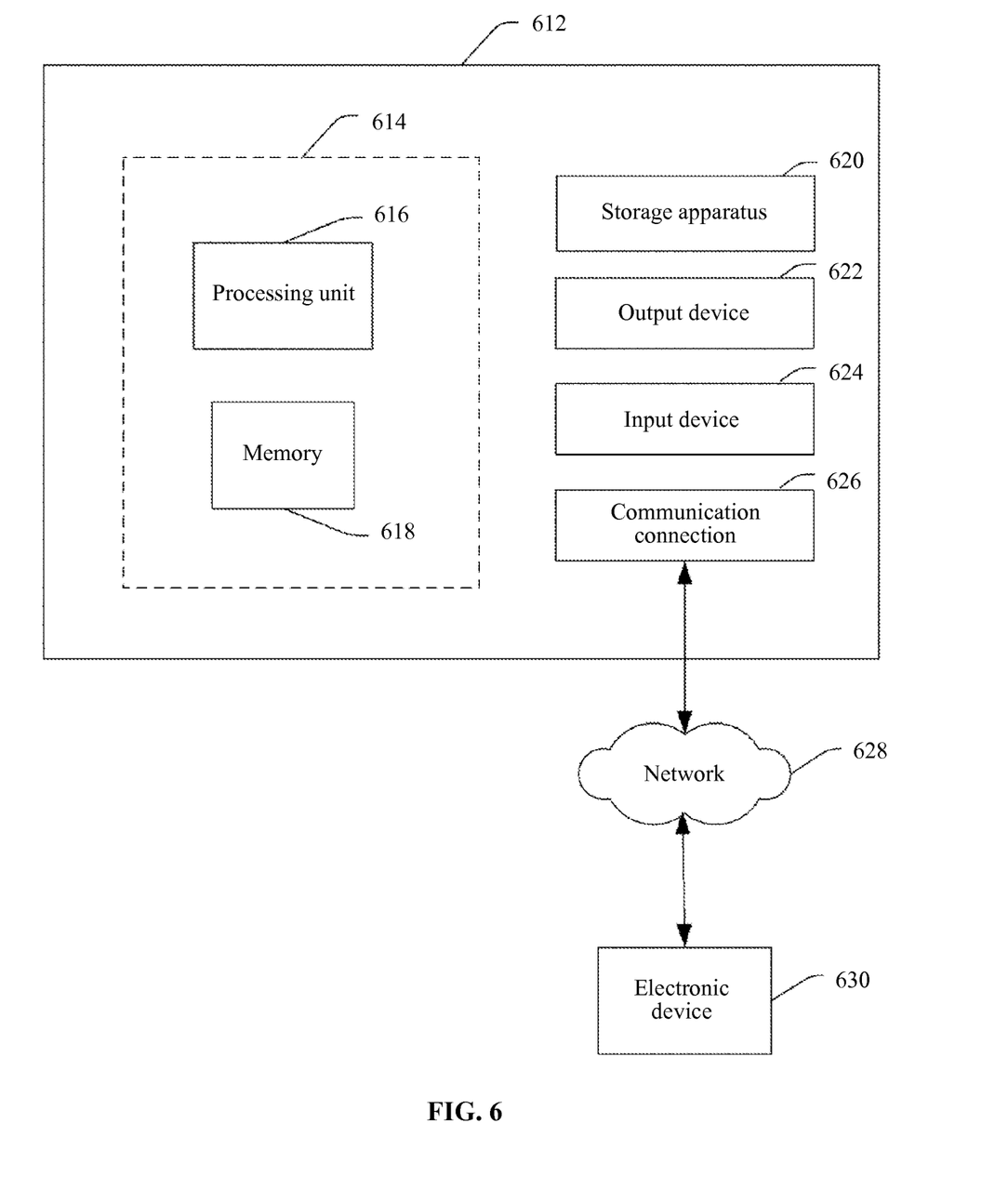
FIG. 6 is a schematic structural diagram of an operating environment of an electronic device according to various embodiments of the present disclosure.

FIG. 6 and the following discussion are intended to provide a brief, general description of an operating environment in which the electronic device according to the present disclosure is implemented. The operating environment in FIG. 6 is merely one example of a suitable operating environment and is not intended to recommend any limitation on the scope of the use or function of an operating environment. An example of the electronic device 612 includes, but is not limited to, a personal computer, a server computer, a hand-held or laptop device, a mobile device (for example, a mobile phone, a personal digital assistant (PDA), and/or a media player), a multiprocessor system, a consumer electronic device, a minicomputer, a mainframe computer, a distributed computing environment that include any of the above systems or devices, and the like.

Although not required, embodiments are described in the general context of "computer-readable instructions" being executed by one or more electronic devices. The computer-executable instructions may be distributed by means of computer-readable media (discussed below). The computer-readable instructions may be implemented as program modules, for example, functions, objects, application programming interfaces (API), data structures and the like that perform particular tasks or implement particular abstract data types. Typically, the functionality of the computer-readable instructions may be combined or distributed as desired in various embodiments.

FIG. 6 shows an example of an electronic device 612 consistent with one or more embodiments of the common message sending method according to the present disclosure. In a configuration, the electronic device 612 includes at least one processing unit 616 and a memory 618. According to a specific configuration and type of the electronic device, the memory 618 may be volatile (for example, a RAM), nonvolatile (for example, a ROM, or a flash memory) or a combination of the two. The configuration is shown by the dotted line 614 in FIG. 6.

In other embodiments, the electronic device 612 may include additional features and/or functions. For example, the device 612 may further include an additional storage apparatus (for example, removable and/or non-removable), which includes, but is not limited to, a magnetic storage apparatus, an optical storage apparatus, and the like. Such an additional storage apparatus is shown as a storage apparatus 620 in FIG. 6. In one embodiment, the computer-readable instructions for implementing one or more embodiments provided herein may be located in the storage apparatus 620. The storage apparatus 620 may further store other computer-readable instructions for implementing an operating system, an application program, and the like. The computer-readable instruction may be loaded in the memory 618 and executed by, for example, the processing unit 616.

The term "computer-readable media" used herein include computer storage media. The computer storage media include volatile and non-volatile, and removable and non-removable media implemented in any method or technology for storage of information such as computer-readable instructions or other data. The memory 618 and the storage apparatus 620 are both examples of computer storage media. Computer storage media include, but are not limited to, RAM, ROM, EEPROM, flash memory or other memory technologies, CD-ROM, digital versatile disks (DVD) or other optical storage apparatuses, magnetic cassettes, magnetic tape, magnetic disk storage apparatuses or other magnetic storage devices, or any other medium which can be used to store desired information and which can be accessed by the electronic device 612. Any such computer storage media may be part of the electronic device 612.

The electronic device 612 may further include a communication connection 626 that allows communication between the electronic device 612 and another device. The communication connection 626 may include, but is not limited to, a modem, a network interface card (NIC), an integrated network interface, a radio frequency transmitter/receiver, an infrared port, a USB connection, or other interfaces for connecting the electronic device 612 to other electronic devices. The communication connection 626 may include a wired connection or a wireless connection. The communication connection 626 may transmit and/or receive communication media.

The term "computer-readable medium" may include a communication medium. The communication medium may typically be embodied by a computer-readable instruction or other data in a "modulated data signal", such as a carrier wave or other transport mechanism, and may include any information delivery medium. The term "modulated data signal" may include such a signal that has one or more of its characteristics set or changed in such a manner as to encode information in the signal.

The electronic device 612 may include an input device 624 such as a keyboard, a mouse, a stylus, a voice input device, a touch input device, an infrared camera, a video input device, and/or any other input device. The device 612 may also include an output device 622, for example, one or more displays, speakers, printers, and/or any other output device. The input device 624 and the output device 622 may be connected to the electronic device 612 via a wired connection, a wireless connection, or any combination thereof. In one embodiment, an input device or an output device from another electronic device may be used as the input device 624 or the output device 622 for the electronic device 612.

Components of the electronic device 612 may be connected by various interconnects (for example, a bus). Such interconnects may include a Peripheral Component Interconnect (PCI) (for example, PCI Express), a Universal Serial Bus (USB), firewire (IEEE 1394), an optical bus structure, and the like. In another embodiment, components of the electronic device 612 may be interconnected by a network. For example, the memory 618 may be formed of multiple physical memory units located in different physical locations interconnected by a network.

Those skilled in the art will realize that storage devices utilized to store computer readable instructions may be distributed across a network. For example, an electronic device 630 accessible via a network 628 may store computer-readable instructions to implement one or more embodiments provided in the present disclosure. The electronic device 612 may access the electronic device 630 and download a part or all of the computer readable instructions for execution. Alternatively, the electronic device 612 may download multiple pieces of the computer readable instructions, as needed, or some instructions may be executed at the electronic device 612 and some at the electronic device 630.

In this manner, various embodiments provide technical problems in the Internet and computer technology to provide methods, electronic devices, and storage media for fast and efficiently sending common messages to followers of different users. For example, followers and friends of different users are compared and grouped for sending the common message, e.g., in batches. Technical problems due to a long-time delay and low efficiency in sending a common message in an existing method and apparatus can thus be solved.

Various operations of embodiments are provided herein. In one embodiment, one or more of the operations may constitute computer-readable instructions stored on one or more computer-readable media, which if executed by an electronic device, will cause a computing device to perform the operations. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (for example, elements, resources, and the like), the terms used to describe such components are intended to correspond (unless otherwise indicated) to any component which performs the specified function of the described component (for example, that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising".

In conclusion, the present disclosure has been disclosed above through exemplary embodiments, but is not intended to be limited thereto. Various variations and modifications made by persons skilled in the art without departing from the spirit and scope of the present disclosure fall within the scope of the present disclosure as defined by the appended claims.

What is claimed is:

1. A common message sending method, comprising:

A: acquiring, according to user numbers on a platform, followers of a first user to construct a first subset, and acquiring followers of a second user to construct a second subset, wherein the followers of the first user are acquired in an ascending order or a descending order to construct the first subset, the followers of the second user are acquired in an ascending order or a descending order to construct the second subset, and a quantity of the followers in the first subset and a quantity of the followers in the second subset are preset values greater than one; and B: acquiring common followers in the first subset and the second subset, and sending a common message to the common followers, wherein the common message includes a conversation information between the first user and the second user;

separately sending the common message for an online follower and sending the common message for an offline follower, wherein at a same time a processing priority level of sending of the common message for the online follower is higher than a processing priority level of sending of the common message for the offline follower, thereby reducing pressure on a message sending server by processing of common message sending at different priority levels for the online user and the offline user;

permanently removing, according to user numbers of the followers in the first subset and user numbers of the followers in the second subset, all the followers in the first subset or all the followers in the second subset; and returning to Step A until acquisition of the followers of the first user is completed or acquisition of the followers of the second user is completed.

2. The common message sending method according to claim 1, wherein, when the followers of the first user are acquired in the ascending order to construct the first subset, and the followers of the second user are acquired in the ascending order to construct the second subset, the Step B comprises:

removing, if a highest user number of the followers in the first subset is greater than a highest user number of the followers in the second subset, all the followers in the second subset; and removing, if the highest user number of the followers in the first subset is less than the highest user number of the followers in the second subset, all the followers in the first subset; and wherein, when the followers of the first user are acquired in the descending order to construct the first subset, and the followers of the second user are acquired in the descending order to construct the second subset, Step B comprises:

removing, if a lowest user number of the followers in the first subset is less than a lowest user number of the followers in the second subset, all the followers in the second subset; and removing, if the lowest user number of the followers in the first subset is greater than the lowest user number of the followers in the second subset, all the followers in the first subset.

3. The common message sending method according to claim 1, wherein the Step B comprises:

acquiring the common followers in the first subset and the second subset, and sending the common message to the common followers;

determining, according to the user numbers of the followers in the first subset and the user numbers of the followers in the second subset, to remove the followers in the first subset and the followers in the second subset; and returning to Step A until acquisition of the followers of the first user is completed or acquisition of the followers of the second user is completed.

4. The common message sending method according to claim 3, wherein, when the followers of the first user are acquired in the ascending order to construct the first subset, and the followers of the second user are acquired in the ascending order to construct the second subset, Step B comprises:

removing, if a highest user number of the followers in the first subset is greater than a highest user number of the followers in the second subset, all the followers in the second subset, and removing followers, whose user numbers are less than or equal to the highest user number in the second subset, in the first subset; and removing, if the highest user number of the followers in the first subset is less than the highest user number of the followers in the second subset, all the followers in the first subset, and removing followers, whose user numbers are less than or equal to the highest user number in the first subset, in the second subset; and wherein, when the followers of the first user are acquired in the descending order to construct the first subset, and the followers of the second user are acquired in the descending order to construct the second subset, Step B comprises:

removing, if a lowest user number of the followers in the first subset is less than a lowest user number of the followers in the second subset, all the followers in the second subset, and removing followers, whose user numbers are greater than or equal to the lowest user number in the second subset, in the first subset; and removing, if the lowest user number of the followers in the first subset is greater than the lowest user number of the followers in the second subset, all the followers in the first subset, and removing followers, whose user numbers are greater than or equal to the lowest user number in the first subset, in the second subset.

5. The common message sending method according to claim 1, further comprising:

acquiring, if all the followers in the first subset have been removed in Step B, according to the user numbers on the platform, the followers of the first user in an ascending or a descending order to form the first subset, wherein the quantity of the followers in the first subset is the preset value; or acquiring, if all the followers in the second subset have been removed in Step B, according to the user numbers on the platform, the followers of the second user in an ascending or a descending order to form the second subset, wherein the quantity of the followers in the second subset is the preset value.

6. The common message sending method according to claim 3, further comprising:
    acquiring, if all the followers in the first subset have been removed in Step B, according to the user numbers on the platform, the followers of the first user in an ascending or a descending order to form the first subset, wherein the quantity of the followers in the first subset is the preset value; or
    acquiring, if all the followers in the second subset have been removed in Step B, according to the user numbers on the platform, the followers of the second user in an ascending or a descending order to form the second subset, wherein the quantity of the followers in the second subset is the preset value.

7. An electronic device, comprising:
    one or more processors; and
    a memory coupled to the one or more processors, wherein the one or more processors are configured to:
    acquire, according to user numbers on a platform, followers of a first user to construct a first subset, and acquire followers of a second user to construct a second subset; wherein the followers of the first user are acquired in an ascending order or a descending order to construct the first subset, the followers of the second user are acquired in an ascending order or a descending order to construct the second subset, and a quantity of followers in the first subset and a quantity of followers in the second subset are both preset values greater than one; and
    acquire common followers in the first subset and the second subset, and send a common message to the common followers, wherein the common message includes a conversation information between the first user and the second user;
    separately send the common message for an online follower and send the common message for an offline follower, wherein at a same time a processing priority level of sending of the common message for the online follower is higher than a processing priority level of sending of the common message for the offline follower, thereby that reducing pressure on a message sending server by processing of common message sending at different priority levels for the online user and the offline user;
    permanently remove, according to user numbers of the followers in the first subset and user numbers of the followers in the second subset, all the followers in the first subset or all the followers in the second subset.

8. The electronic device according to claim 7, wherein, when the followers of the first user are acquired in the ascending order to construct the first subset, and the followers of the second user are acquired in the ascending order to construct the second subset, the one or more processors are further configured to:
    remove, if a highest user number of the followers in the first subset is greater than a highest user number of the followers in the second subset, all the followers in the second subset; and
    remove, if the highest user number of the followers in the first subset is less than the highest user number of the followers in the second subset, all the followers in the first subset; and
    wherein, when the followers of the first user are acquired in the descending order to construct the first subset, and the followers of the second user are acquired in the descending order to construct the second subset, the one or more processors are further configured to:
    remove, if a lowest user number of the followers in the first subset is less than a lowest user number of the followers in the second subset, all the followers in the second subset; and
    remove, if the lowest user number of the followers in the first subset is greater than the lowest user number of the followers in the second subset, all the followers in the first subset.

9. The electronic device according to claim 7, wherein the one or more processors are further configured to:
    determine, according to user numbers of the followers in the first subset and user numbers of the followers in the second subset, to remove the followers in the first subset and the followers in the second subset.

10. The electronic device according to claim 9, wherein, when the followers of the first user are acquired in the ascending order to construct the first subset, and the followers of the second user are acquired in the ascending order to construct the second subset, the one or more processors are further configured to:
    remove, if a highest user number of the followers in the first subset is greater than a highest user number of the followers in the second subset, all the followers in the second subset, and remove followers, whose user numbers are less than or equal to the highest user number in the second subset, in the first subset; and
    remove, if the highest user number of the followers in the first subset is less than the highest user number of the followers in the second subset, all the followers in the first subset, and remove followers, whose user numbers are less than or equal to the highest user number in the first subset, in the second subset; and
    wherein, when the followers of the first user are acquired in the descending order to construct the first subset, and the followers of the second user are acquired in the descending order to construct the second subset, the one or more processors are further configured to:
    remove, if a lowest user number of the followers in the first subset is less than a lowest user number of the followers in the second subset, all the followers in the second subset, and remove followers, whose user numbers are greater than or equal to the lowest user number in the second subset, in the first subset; and
    remove, if the lowest user number of the followers in the first subset is greater than the lowest user number of the followers in the second subset, all the followers in the first subset, and remove followers, whose user numbers are greater than or equal to the lowest user number in the first subset, in the second subset.

11. The electronic device according to claim 7, wherein the one or more processors are further configured to:
    acquire, if all the followers in the first subset have been removed, according to the user numbers on the platform, the followers of the first user in an ascending or a descending order to form the first subset, wherein the quantity of the followers in the first subset is the preset value; or
    acquire, if all the followers in the second subset have been removed, according to the user numbers on the platform, the followers of the second user in an ascending or a descending order to form the second subset, wherein the quantity of the followers in the second subset is the preset value.

12. The electronic device according to claim 10, wherein the one or more processors are further configured to:
    acquire, if all the followers in the first subset have been removed, according to the user numbers on the platform, the followers of the first user in an ascending or a descending order to form the first subset, wherein the quantity of the followers in the first subset is the preset value; and acquire, if all the followers in the second subset have been removed, according to the user numbers on the platform, the followers of the second user in an ascending or a descending order to form the second subset, wherein the quantity of the followers in the second subset is the preset value.

13. A non-transitory storage medium, storing an instruction executable by a processor, the processor executing the instruction to provide a common message sending method, comprising:

A: acquiring, according to user numbers on a platform, followers of a first user to construct a first subset, and acquiring followers of a second user to construct a second subset; wherein the followers of the first user are acquired in an ascending order or a descending order to construct the first subset, the followers of the second user are acquired in an ascending or a descending order to construct the second subset, and a quantity of the followers in the first subset and a quantity of the followers in the second subset are both preset values greater than one; and B: acquiring common followers in the first subset and the second subset, and sending a common message to the common followers, wherein the common message includes a conversation information between the first user and the second user;

separately sending the common message for an online follower and sending the common message for an offline follower, wherein at a same time a processing priority level of sending of the common message for the online follower is higher than a processing priority level of sending of the common message for the offline follower, thereby reducing pressure on a message sending server by processing of common message sending at different priority levels for the online user and the offline user;

permanently removing, according to user numbers of the followers in the first subset and user numbers of the followers in the second subset, all the followers in the first subset or all the followers in the second subset; and returning to Step A until acquisition of the followers of the first user is completed or acquisition of the followers of the second user is completed.

14. The common message sending method according to claim 1, wherein the sending of the common message for the online follower has a priority level higher than the sending of the common message for the offline follower, comprises:

sending the common message for the offline follower after the common message for the online follower is sent out.

15. The electronic device according to claim 7, wherein the online common message sending unit has a priority level higher than the offline common message sending unit to send the common message, comprises:

sending the common message for the offline follower after the common message for the online follower is sent out.

16. The non-transitory storage medium according to claim 13, wherein the sending of the common message for the online follower has a priority level higher than the sending of the common message for the offline follower, comprises:

sending the common message for the offline follower after the common message for the online follower is sent out.

17. The common message sending method according to claim 1, wherein the conversation information between the first user and the second user comprises a text conversation, an audio conversation, or a video conversation between the first user and the second user.

18. The electronic device according to claim 7, wherein the conversation information between the first user and the second user comprises a text conversation, an audio conversation, or a video conversation between the first user and the second user.

19. The non-transitory storage medium according to claim 13, wherein the conversation information between the first user and the second user comprises a text conversation, an audio conversation, or a video conversation between the first user and the second user.

* * * * *